(12) United States Patent
Wünscher et al.

(10) Patent No.: US 6,179,113 B1
(45) Date of Patent: Jan. 30, 2001

(54) POINTS FOR A CONVEYOR ARRANGEMENT

(75) Inventors: Eduard Wünscher; Karl Freudelsperger, both of Hart bei Graz (AT)

(73) Assignee: Knapp Logistik Automation Gellschaft m.b.H., Hart Bei Graz (AT)

( * ) Notice: Under 35 U.S.C. 154(b), the term of this patent shall be extended for 0 days.

(21) Appl. No.: 09/355,505

(22) PCT Filed: Jan. 15, 1998

(86) PCT No.: PCT/AT98/00004

§ 371 Date: Jul. 29, 1999

§ 102(e) Date: Jul. 29, 1999

(87) PCT Pub. No.: WO98/33727

PCT Pub. Date: Aug. 6, 1998

(30) Foreign Application Priority Data

Jan. 29, 1997 (AT) .......................................... 127/97

(51) Int. Cl.[7] .................................................. B65G 47/26
(52) U.S. Cl. ............................................. 198/436; 198/782
(58) Field of Search ................................... 198/348, 790, 198/791, 782, 787, 341.05, 341.07, 434

(56) References Cited

U.S. PATENT DOCUMENTS

| | | |
|---|---|---|
| 1,460,539 | 7/1923 | Edwards . |
| 3,912,062 | 10/1975 | Hutchinson . |
| 4,399,675 | 8/1983 | Erdmann et al. . |
| 5,333,722 | 8/1994 | Ouellette . |

FOREIGN PATENT DOCUMENTS

| | | |
|---|---|---|
| 416 458 | 1/1967 | (CH) . |
| 39 43 185 | 7/1991 | (DE) . |
| 0 051 039 | 5/1982 | (EP) . |
| 0 311 699 | 4/1989 | (EP) . |
| 0 438 820 | 7/1991 | (EP) . |
| 7 903 710 | 11/1980 | (NL) . |

OTHER PUBLICATIONS

MG Heftsystem brochure Vollautomatische Stulpboden–Stulpdeckel–Hefsmaschine SHA, Germany.

*Primary Examiner*—Kenneth W. Noland
(74) *Attorney, Agent, or Firm*—Sughrue, Mion, Zinn, Macpeak & Seas, PLLC

(57) ABSTRACT

Disclosed is a shunt (3) for a conveyor arrangement for selectively diverting conveyed articles from one conveyor (1) to at least one other conveyor (5), and comprising rollers (7) mounted to be rotatable about a horizontal axis, at least some of the rollers being driven, the rollers (7) being mounted in a frame (23) so as to be pivotable about a vertical axis and being coupled with a pivoting drive (30, 32). To prevent foreign matter from entering into the shunt (3) from above, the rollers (7) project through cavities (40) of cover disks (38) which are centrically arranged relative to the vertical pivot axis of the rollers (7) as well as to be pivotable together therewith, and a cover plate (34) extending over the remaining region of the shunt (3) is provided which has cavities (37) matching the cover disks (38).

17 Claims, 4 Drawing Sheets

POINTS FOR A CONVEYOR ARRANGEMENT

The invention relates to a shunt for a conveyor arrangement, for selectively diverting conveyed articles, e.g. containers, from one conveyor to at least one other conveyor, and comprising rollers mounted to be rotatable about a horizontal axis, at least some of the rollers being driven, the rollers being mounted in a frame so as to be pivotable about a vertical axis and being coupled with a pivoting drive.

Such a shunt is known from AT 294 693 B. In this shunt, all structural elements lie free so as to be accessible from the top side. The entry of foreign matter, such as, e.g., parts of packaging material of the conveyed articles or of items dropping out of containers, may cause blocking of the driving and adjusting elements. Moreover, there is the risk of the operating personnel being injured when they carry out manipulations on the conveying track or on the shunt, respectively, during operation thereof.

On the other hand, a guide roll unit is known from DE 39 43 185 A which can be used in conveying tracks for articles to be moved. There, the guide roll unit comprises two non-driven carrying rolls adjacently arranged on a geometric horizontal axis which are mounted to be independently rotatable in a needle bearing of a circularly designed rotating unit. This rotating unit in turn is mounted via spheres in a likewise circularly designed housing base portion to be rotatable about a vertical axis. The (horizontal) geometric axis of rotation of the carrying rolls is, however, arranged to be eccentrically offset relative to the vertical axis of the housing base portion, so that when an article is shifted or moved on the guide roll unit, the carrying rolls automatically align in the direction of movement of this article. A roll retainer above the rotating unit has a rectangular opening for the carrying rolls to pass therethrough. The guide roll unit is insertable into an opening of a conveyor panel. Therefore, this is not a shunt at all serving for selectively diverting conveyed articles from one conveyor to another conveyor.

Furthermore, from CH 416 458 A, a shunt for small roller conveyors comprising a pivoting mechanism for the small rollers is known which, however, is comparatively complex as regards its mechanics, apart from the fact that in that case there is no guarantee against the entry of foreign matter or a risk of injury to persons. For this purpose, in detail, the pivoting mechanism consists of pivoting rods hinged to the entry path of the conveyor, the pivoting rods including long holes. Slide pins engage in these long holes, which slide pins are fastened to pivot levers fastened to perpendicular pins on which the small rollers of the shunt are arranged. The pivot rods are hinged to a common actuating rod.

The invention has as its object to provide a shunt of the initially defined type, which ensures a high safety for the operating personnel against injuries as well as against blocking of the conveyor by foreign matter.

According to the invention, this object is achieved in that the rollers project through cavities of cover disks which are arranged to be centric relative to the vertical pivot axis of the rollers as well as to be pivotable together therewith, and that at least one cover plate generally extending over the remaining region of the shunt is provided which has cavities matching the cover disks. By this design, the above-mentioned object can well be met, the entry of foreign matter into the shunt construction being prevented despite the pivotability of the rollers which allow the diversion of the conveyed articles and the risk of injury described being avoided. Thus, also rigid safety rules for conveying paths can be compiled with.

According to a preferred, structurally simple and suitable embodiment of the invention it is provided that the cavities in the cover disks are generally rectangular and receive the rollers with a slight play, e.g. with a gap of from 0.5 mm to 4 mm, for instance approximately 1 mm.

A structurally simple arrangement or embodiment of the cover disks is furthermore obtained if the cover disks are arranged with an axial play, e.g. of from 0.5 mm to 4 mm, for instance approximately 1 mm, below the cavities of the cover plate. Moreover, for reasons of space, it is advantageous if the cavities of the cover plate are generally circular just like the cover disks. In this connection it is also suitable for safety reasons if the diameter of the cover disks is somewhat larger than the diameter of the cavities.

According to a further preferred embodiment of the invention it is provided that the upper sides of the cover disks and of the cover plate extend on the same level. Such a flush, i.e. level, arrangement of all the cover elements meets the safety efforts particularly well. Also the restricted space or structural height available within the shunt construction is optimally used. A mounting for the rollers which is particularly advantageous in terms of safety is characterized in that the cover disks are inserted in the circular cavities of the cover plate with a radial play of from 0.5 mm to 4 mm, for instance approximately 1 mm.

Thus, in the afore-mentioned embodiments or designs of the cover disks it is ensured to a great extent that matter larger than the determined minimum gap between the mentioned moving and stationary structural parts of the shunt cannot enter between the rotating rollers and the cover disks, on the one hand, and between the pivotable cover disks and the recesses of the stationary cover plates, on the other hand.

To mount the rollers so as to be pivotable about a vertical axis it is also advantageous if the rollers are mounted on the legs of U-shaped bows, the cover disks being fastened to the, preferably outwardly angled, upper ends of the legs. By this measure, the cover plates can be mounted in a simple manner such that they are pivotable together with the rollers, and in case of need, the U-shaped bows can be exchanged quickly and simply together with the rollers after taking off the cover plate, without the aid of a tool.

For a structural simple pivoting of the rollers it is suitable if a bearing bushing is centrally arranged on the lower side of the base of the respective U-shaped bow, which bearing bushing is slipped onto a bearing pin fastened to a cross member of the frame of the shunt. Here, too, it may advantageously be provided that for pivoting the rollers about the axle of the bearing pin, the base of the U-shaped bow comprises a laterally outwardly arranged, optionally circular-arc-shaped long hole, in which a pin engages which is fastened to a connecting rod. In this manner, advantageously a simultaneous pivoting of the rollers is enabled by a small number of structural elements, resulting also in a low wear of the structural elements in this construction. With a view to an effective drive with rugged control means, it is also advantageous if a pneumatic cylinder is associated to the connecting rod as a drive.

To be able to carry out mounting of the shunt or maintenance jobs on the shunt quickly and in a simple manner, it is also suitable if the cover plate is fixable, or fixed, respectively, on the frame of the shunt by means of snap connections, e.g. in the form of ball catches.

To drive the rollers, it is particularly suitable if the frame of the shunt is formed by U-shaped cross members each having two superposed C-shaped section rails at their ends, and the bearings for the rollers are fastened to the cross members. In this manner, it becomes possible in an advantageous way to produce the shunt in modular construction and to quickly install it into conveyors to be newly set up or already existing. To achieve a simple roller drive, it is also advantageous if the rollers have a central peripheral groove in which a driving belt engages which is guided around a drive roller mounted below the rollers. Here, too, it is suitable if each drive roller as well as carrying rollers optionally located in the section of the shunt are driven by a common driving belt. In this manner, merely a single drive motor is required for the common driving belt.

To increase frictional engagement of the conveyed articles, or containers, respectively, it is particularly suitable if the rollers on both sides of the central peripheral groove are provided with further peripheral grooves to receive O-rings of rubber.

To additionally increase the safety against entry of foreign matter into the region of the rollers it is also advantageous if the contour of the cavities of the cover disks is adapted to the contour of the rollers.

It has also proven suitable if the cover plate extends over a section of a further, removing conveyor track extending in parallel to the conveyor, and that the rollers arranged, e.g., in pairs, are arranged offset in the direction of the removing conveyor track. Thereby, the conveyed articles or containers, respectively, may selectively be transported on either in the main conveying direction or from there in a secondary conveying direction extending in parallel thereto.

In an additional advantageous realization of this embodiment of the shunt it is provided that the forward rollers are pivotable and the rearward rollers are fixable. This fixed adjustment can be performed when mounting the conveyor arrangement corresponding to the orientation of the removing conveyor track, thus not necessitating any later re-adjustment, thereby making the construction simpler.

To be able to convey the conveyed articles or containers, respectively, selectively from two feeding conveyor tracks each in straight or in crossing relationship, it is also advantageous if the cover plate extends over a section of a further feeding conveyor track extending in parallel to the conveyor, which further feeding conveyor track continues towards the removing conveyor track, further pivotable rollers in offset arrangement being provided. There, it is also advantageous if the last rollers extending in parallel are fixedly adjustable, since this reduces the number of structural elements required.

The invention will now be explained in more detail by way of the exemplary embodiments illustrated in the drawing to which, however, it shall not be restricted.

Figure 1:
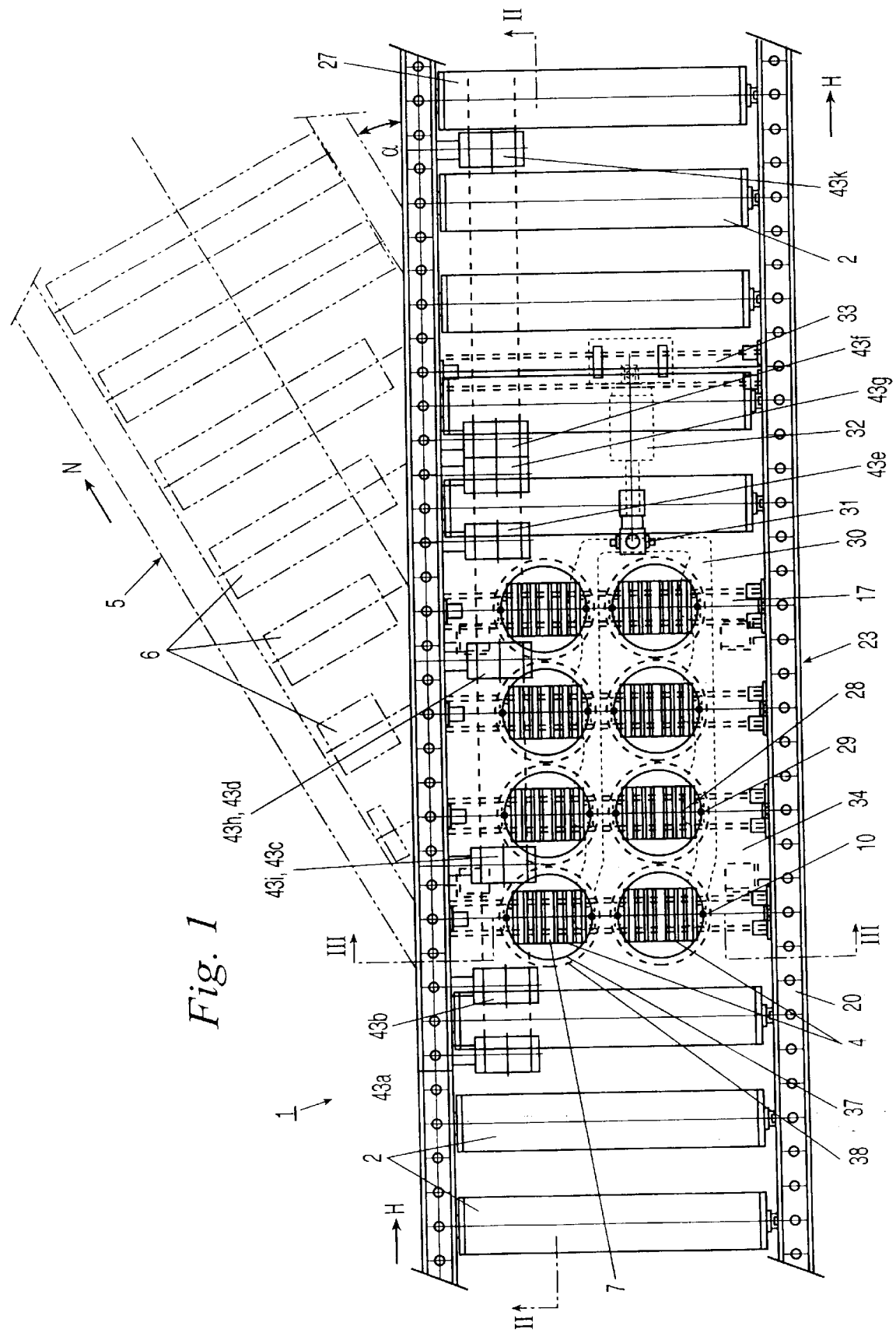
FIG. 1 shows a roller conveyor with a shunt, in top view.
Figure 2:
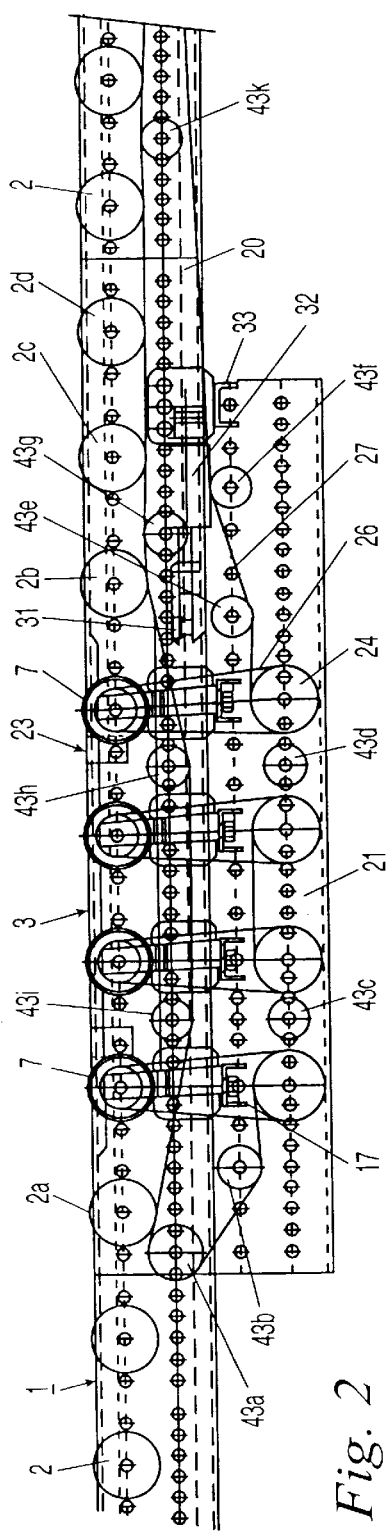
FIG. 2 shows the roller conveyor according to FIG. 1 in a section along lines II—II of FIG. 1.

In FIGS. 1 and 2, a roller conveyor generally denoted by 1 has driven carrying rollers 2, a shunt 3 being arranged with four adjustable and driven roller pairs 4. In the region of the shunt 3, a further roller conveyor track 5 comprising carrying rollers 6 branches off from the conveyor 1 towards the left-hand side, which further roller conveyor track defines a secondary conveying direction N enclosing an angle α of from 30° to 60°, e.g., with the main conveying direction H.

The carrying rollers 6 may either be driven or rotate freely if the roller conveyor 1 or 5, respectively, is designed as a gravity roller track.

Figure 3:
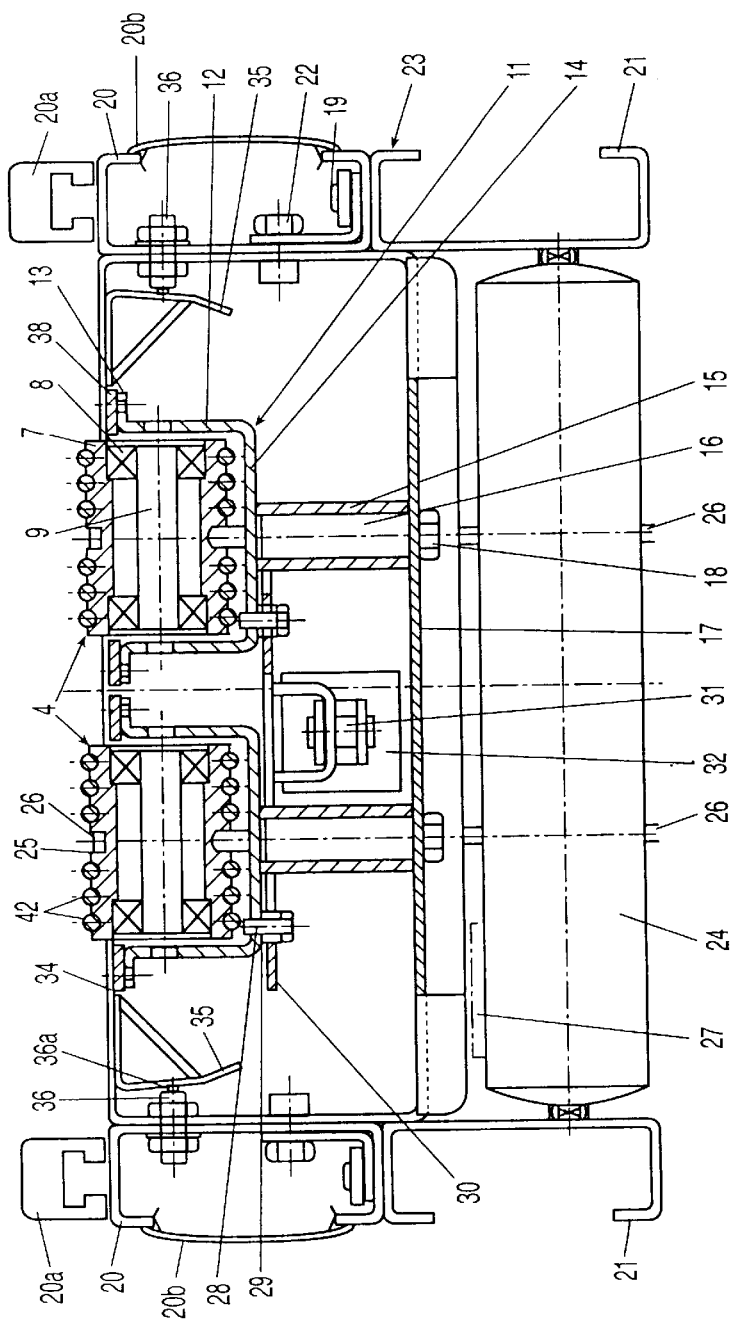
FIG. 3 shows a section along line III—III of FIG. 1, in an enlarged representation.

The rollers 7 of the roller pairs 4 of the shunt, as is particularly visible from FIG. 3, are each mounted, via ball bearings 8, on a shaft 9, the ends of the shaft being retained in a bearing body 10. The bearing body 10 is formed as a U-shaped bow 11 on the legs 12 of which the shaft 9 is attached. The ends 13 of the legs 12 are angled outwardly and serve as fastening part, as will be explained further below. A bearing bushing 15 is centrally welded to the base 14 of the U-shaped bow 11, which bearing bushing 15 is slipped onto a bearing pin 16 that is fastened to a cross member 17 of U-shaped cross-section by means of a screw 18.

A respective lateral cover on each side of the shunt 3 is formed by two C-shaped section rails 20, 21 superposed and interconnected by means of rivet 19, the base portion or web of the U-shaped cross member 17 being upwardly angled at its ends and connected with the upper section rail 20 by means of screws 22 so as to form a frame 23 like a ladder frame for the shunt 3. One each upper section rail 20, a lateral guide rail 20a for the conveyed articles or for the containers is attached; the free opening of the section rail 20 is closed by a cover 20b which, e.g., is snapped on. Between the two lower C-shaped section rails 21, a drive roller 24 is arranged, or rotatably mounted in the section rails 21, respectively. Each roller 7 has a central peripheral groove 25. A driving belt 26 embraces the driving roller 24 and the roller 7 in the peripheral groove 24 thereof (cf. FIG. 2 in addition to FIG. 3), so as to drive the roller 7 from the driving roller 24. A driving belt 27 (cf. also FIG. 2) illustrated in dot-and-dash lines in FIG. 3 drives the respective driving rollers 24 and thus, indirectly, also the associated rollers 7.

The carrying rollers 2a to 2d arranged in the region of the shunt 3, as may be seen in FIG. 2, likewise are driven by the driving belt 27 which is guided via several deflection or tensioning pulleys 43a to 43i, and further deflection or tensioning pulleys outside of the shunt 3—one of which further deflection or tensioning pulleys, 43k, is illustrated, too, and is driven by a drive motor (not illustrated).

To pivot the roller pairs 4 of the rollers 7 about the vertically directed axis of the bearing pin 16, the base (the web) 14 of each U-shaped bow 11 includes a lateral, outward long hole 28 (cf. FIGS. 1 and 3) in which a pin-shaped end of a screw 29 engages which is screwed to one of the arms of a two-armed, i.e. fork-shaped, connecting rod 30. (Of course, also the fork arms of the connecting rod 30 could be provided with a long hole, and the screws 29 could be tightly screwed in threaded bores of the bows 11.) Via a hinge 31, the connecting rod 30 is coupled with the piston rod of a pneumatic cylinder 32 which is fastened to a cross member 33 of the frame 23 (cf. also FIG. 2). In the embodiment according to FIGS. 1 to 3, by actuating the cylinder 32, thus all the roller pairs 4 and the rollers 7, respectively, simultaneously can be pivoted from the main conveying direction H into the secondary conveying direction N (and back) so that a conveyed article arriving from the left-hand side in FIG. 1 on the roller conveyor 1, e.g. a collecting or transportation container, is diverted to the roller conveyor 5.

Figure 5:
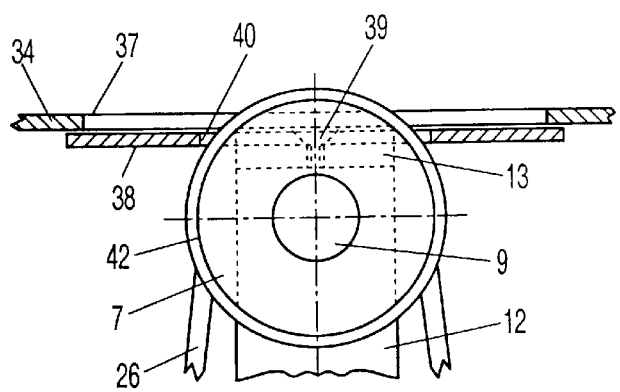
FIG. 5 shows a further roller cover, partially sectioned.
Figure 6:
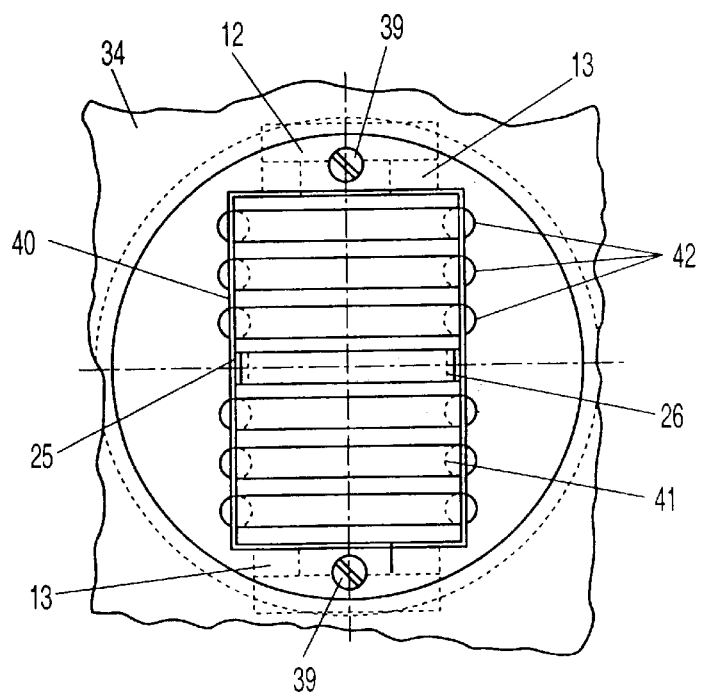
FIG. 6 shows a top view onto the roller cover according to FIG. 5.

To prevent foreign matter from entering the region of the construction parts of the shunt 3, and to protect the operating personnel from being injured by the moving or rotating structural parts when they carry out manipulations in the region of the shunt 3, the upper side of the shunt 3 is provided with a cover. This cover is mainly formed by a stationary cover plate 34 with lateral ends angled downwards, and with the upper side ending flush with the upper flanges of the upper C-shaped section rail 20. On the lower side of the cover plate 34, angular brackets 35 are welded thereto forward of the angled ends of the cover plate, the angular brackets being held by screws 36 adjustably and fixably arranged in the upper C-shaped section rail 20; at their tip, these screws are designed as resilient ball catches which latch into a dent or bore in the angular brackets 35 so as to form a snap connection, whereby the cover plate 34 can simply and quickly be installed and removed. In the region of the rollers 7, the cover plate 34 comprises circular cavities 37, seen in top view. Below these cavities 37, at a distance of e.g. from 0.5 mm to 4 mm, preferably approximately 1 mm, a respective cover disk 38, e.g. likewise circular in top view, is provided which has a diameter larger by approximately 10% to 20% than the diameter of the cavities 37, each cover disk 38 being fastened by means of counter-sunk screws 39 to the outwardly angled ends 13 of the legs 12 of the U-shaped bow 11, as is particularly apparent from FIGS. 5 and 6. Each cover disk 38 is provided with a central rectangular cavity 40 to enable the passage of the associated roller 7; as is particularly apparent from FIG. 6, the rollers 7 are provided with three further peripheral grooves 41 on either side of the central peripheral groove 25, to receive O-rings 42 of rubber so as to increase the friction fit between the conveyed articles or the containers, respectively, and the rollers 7. The central groove 25 is deeper than the grooves 41 so as to ensure that the conveyed articles or the respective containers, respectively, merely rest on the O-rings 42.

Figure 4:
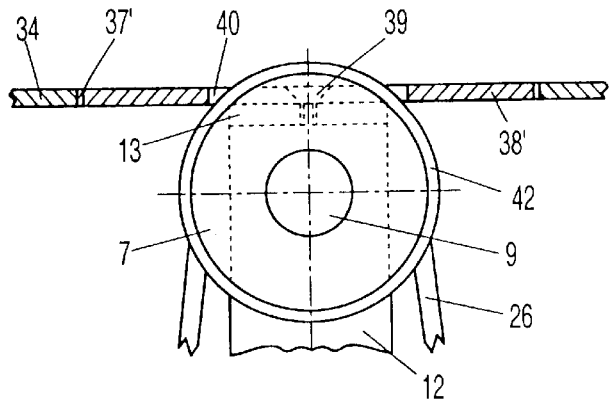
FIG. 4 shows a roller cover, partially sectioned.

In the modified embodiment according to FIG. 4, the cover disk 38' follows level upon the cover plate 34, and it is inserted with a slight radial play of from 0.5 mm to 4 mm, preferably approximately 1 mm, in the circular cavity 37 of the cover plate 34.

The level of the upper sides of the rollers 7 or of the rings 42 thereof, respectively, is higher by about 2 mm than the level of the upper sides of the carrying rollers 2 so as to compensate uneven areas on the lower sides of the conveyed articles or containers, respectively. In the embodiments according to FIGS. 4 to 6 it is also provided for the contour of the cavities 40 of the cover disk 38 or 38', respectively, to be adapted to the contour of the rollers 7 (in particular in the region of the O-rings 42 and of the drive belt 26), a peripheral play of from 0.5 mm to 4 mm, preferably approximately 1 mm, being provided.

Figure 7:
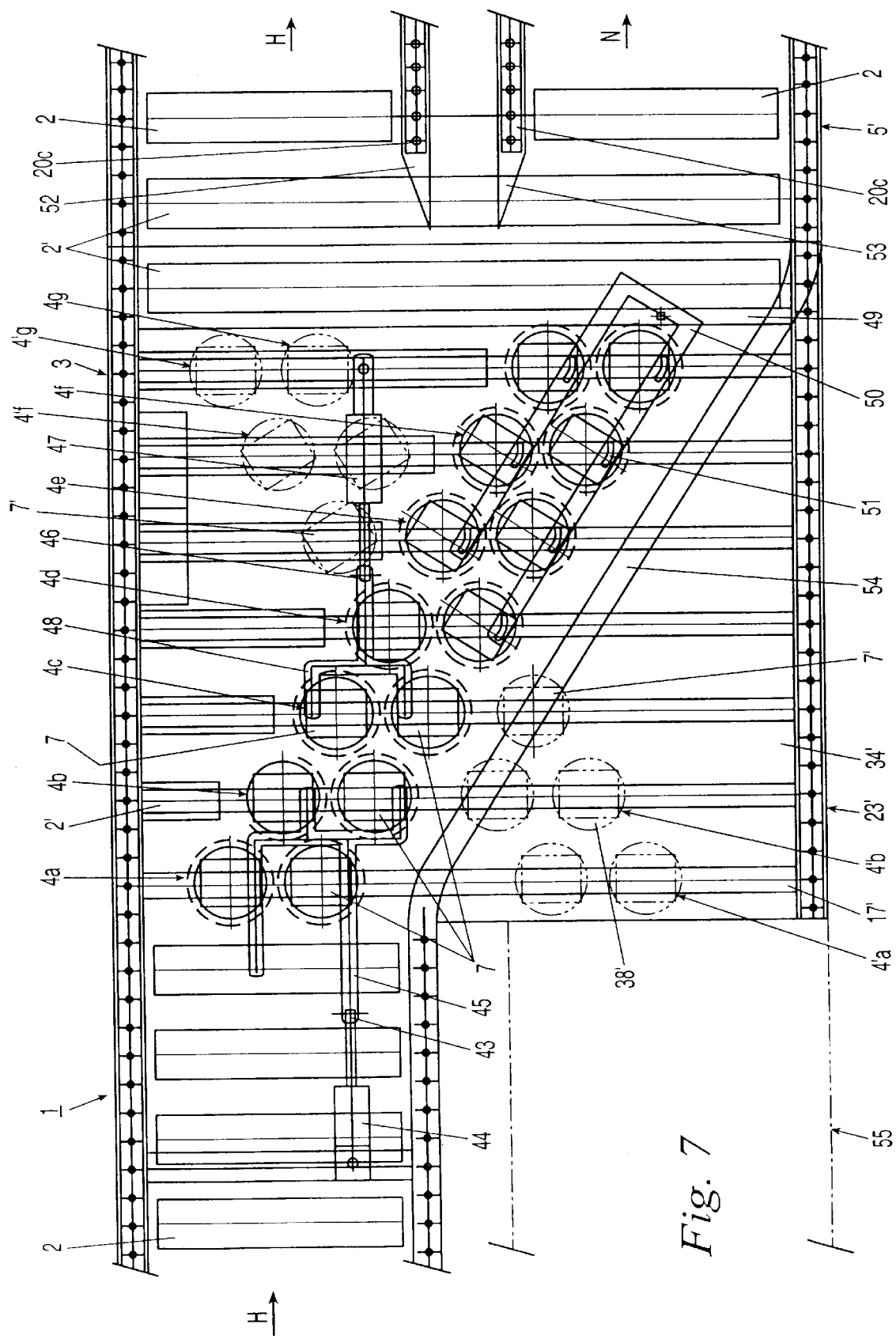
FIG. 7 shows a further exemplary embodiment of a roller conveyor with a shunt, in top view.

In the roller conveyor 1 shown in FIG. 7, after the shunt 3, the further, i.e. diverting, roller conveyor track 5' continues in parallel adjacent the (main) conveyor 1, i.e. the conveyed articles or the containers, respectively, can be diverted from the main conveying direction H to the secondary conveying direction parallel thereto. For this purpose, the shunt 3 is equipped with seven roller pairs 4a to 4g which are arranged offset so as to lead to the secondary conveying direction N, and their rollers 7 are subdivided into three groups. The first group consists of two roller pairs 4a and 4b which are arranged to be pivotable via a three-armed connecting rod 45 connected with the piston rod of a pneumatic cylinder 44 via a hinge 43, in the manner as previously explained by way of FIGS. 1 and 3 which, thus, need not be described again. The second group of rollers consists of a roller pair 4c and one roller 7 of the consecutive roller pair 4d; these rollers are pivotable in a corresponding manner via a two-armed connecting rod 48 connected with the piston rod of a pneumatic cylinder 47 via a hinge 46. The third group consists of the second roller 7 of the aforementioned roller pair 4d and the three subsequent roller pairs 4e to 4g, which are individually fixable on a two-armed rod 50 by means of adjustment screws (not illustrated) engaging in circular long holes 51 of the rod 50 which is rigidly fastened to a cross member 49. Here, the second roller 7 of the roller pair 4d and the rollers 7 of the two subsequent roller pairs 4e and 4f of this third group are adjusted to lead slant to the further roller conveyor 5', while the rollers 7 of the last roller pair 4g are adjusted to lead already into the final conveying direction. This adjustment of the third group of rollers may be effected by a simple fixing mechanism since, as a rule, it is to be effected only once, when the conveyor arrangement is assembled, and then can remain in this manner unless the arrangement of the further conveyor track 5' relative to the main conveyor 1 is changed.

Downstream of the last roller pair 4g, two carrying rollers 2' extend transversely both over the main conveyor 1 and over the further roller conveyor 5'; the remaining carrying rollers 2' oriented in the main conveying direction H are designed in stepped lengths in the region of the shunt 3. Starting with the second carrying roller 2', downstream of the shunt 3, the two roller conveyors 1 and 5' are finally separate paths having separate carrying rollers 2, guiding wedges 20c being arranged in front of the two centrally located upper C-section rails 20 (cf. FIG. 3) of the two roller conveyors 1, 5', so as to direct the conveyed articles, or containers, respectively, into the respective tracks 1 or 5', respectively. In addition, also a guide rail 54 is provided which extends in parallel to the general arrangement of the inclinedly offset roller pairs 4a to 4g, and thus from the arriving conveyor 1 slant to the further conveyor 5'. The cover plate 34' of the shunt 3 extends over the roller pairs 4a to 4g. The individual rollers 7, furthermore, have associated cover disks 38 or 38', respectively, of the type previously described particularly by way of FIGS. 4 to 6, to supplement and complete the protective cover in the region of the shunt.

In the arrangement of the shunt 3 shown in FIG. 1, it is furthermore possible to arrange an additional roller conveyor track which branches off towards the right-hand side, and which basically corresponds to the conveyor 5, to selectively divert the conveyed articles or containers, respectively, towards the left or towards the right or to let them run on straight. The branching angle then amounts to a total of ±30° to ±60°. It is merely essential that the illustrated rollers 7, or roller pairs 4, respectively, can be pivoted from the neutral position shown into both directions, clockwise just as well as counter-clockwise. Consequently, it would also be conceivable in this case to omit the central removing main conveyor track so that an exact Y-configured distribution will be obtained.

Also in the arrangement of the shunt 3 illustrated in FIG. 7, an additional design may be made such that in parallel relationship adjacent the feeding roller conveyor 1, a further feeding roller conveyor 55 is arranged, as is illustrated in FIG. 7 in dot-and-dash lines. The shunt 3 will then be supplemented by e.g. four additional, adjustable roller pairs 4'a, 4'b, 4'f, 4'g offset in stepped manner, as well as by two rollers 7' which likewise are illustrated in dot-and-dash lines, in that case also the roller pairs 4d to 4g being designed to be adjustable, and the roller pairs 4'a, 4'b, 4'f, 4'g together with the roller pairs 4a to 4c and 4e to 4g being arranged cross-wise before and after the central roller pair so that, apart from the transportation on the roller paths 1 or 55-5', respectively, in the respective main conveying direction, also a selective cross-wise movement of the conveyed articles or containers, respectively, from the two delivering regions of the roller conveyors 1, 55 to the respective other, departing regions of the roller conveyor 5' or 1, respectively, becomes possible, i.e. on an "ideal" S-shaped path, whereby a jerky displacement of the conveyed articles or containers, respectively, in conveying direction can be avoided. The two last, oppositely arranged roller pairs 4g, 4g' may also be designed to be fixedly adjustable, to guide each of the conveyed articles already in the main conveying direction.

The shunt arrangements described may, of course, also be used in combination with conveying belts or chain conveyors, in addition to their use for roller conveyors. Besides, also solenoids or electromotors, in particular servomotors, may be used as pivot drive for the rollers 7 and 7', respectively, instead of pneumatic cylinders. Instead of the driving belts 26, 27, also other known transmissions, such as, in particular, drive chains may, of course, be used.

What is claimed is:

1. A shunt for a conveyor arrangement, for selectively diverting conveyed articles, e.g. containers, from one conveyor (1; 55) to at least one other conveyor (5; 5', 1), and comprising rollers (7; 7') mounted in U-shaped bows (11) to be rotatable about a horizontal axis, at least some of the rollers being driven, the rollers (7; 7') with the U-shaped bows (11) being mounted to be pivotable about a vertical axis and being coupled with a pivoting drive (32; 44; 47) and projecting through cavities (40) of cover disks (38; 38') which are arranged to be centric relative to the vertical pivot axis of the rollers (7) as well as to be pivotable together therewith, and comprising at least one cover plate (34; 34') generally extending over the remaining region of the shunt (3) which has cavities (37) matching the cover disks (38; 38'), characterized in that the cover disks (38; 38') are fastened to the, preferably outwardly angled, upper ends (13) of the legs (12) of the U-shaped bows (11), that a bearing bushing (15) is centrally arranged on the lower side of the base (14) of the respective U-shaped bow (11), which bearing bushing is slipped onto a bearing pin (16) fastened to a cross member (17) of the frame (23) of the shunt (3), and that for pivoting the rollers (7; 7') about the axle of the bearing pin (16), a connecting rod (30; 45; 48) is provided which engages on the base (14) of the U-shaped bow (11) via a pin (29).

2. A shunt according to claim 1, characterized in that the base (14) of the U-shaped bow (11) has a lateral outwardly located long hole (28) in which the pin (29) engages which is fastened to the connecting rod (30; 45; 48).

3. A shunt according to claim 1, characterized in that the cavities (40) in the cover disks (38; 38') are generally rectangular as known per se and that the cavities (40) receive the rollers (7) with a slight play, e.g. with a gap of from 0.5 mm to 4 mm, preferably approximately 1 mm.

4. A shunt according to claim 1 characterized in that the cover disks (38) are arranged with an axial play, e.g. of from 0.5 mm to 4 mm, preferably approximately 1 mm, below the cavities (37) of the cover plate (34).

5. A shunt according to claim 4, characterized in that the diameter of the circular cover disks (38) is somewhat larger than the diameter of the circular cavities (37).

6. A shunt according to claim 1, characterized in that the upper sides of the cover disks (38') and of the cover plate (34) extend at the same level.

7. A shunt according to claim 6, characterized in that the cover disks (38') are inserted in the circular cavities (37') of the cover plate (34) with a radial play of from 0.5 mm to 4 mm, preferably approximately 1 mm.

8. A shunt according to claim 1, characterized in that a pneumatic cylinder (32; 44; 47) is associated with the connecting rod (30; 45; 48) as a drive.

9. A shunt according to claim 1, characterized in that the cover plate (34; 34') is fixable, or fixed, respectively, on the frame (23; 23') of the shunt (3) by means of snap connections, e.g. in the form of ball catches (36a).

10. A shunt according to claim 1, characterized in that the frame (23; 23') of the shunt (3) is formed by U-shaped cross members (17; 17') each having two superimposed C-shaped section rails (20, 21) at their ends, and the bearings (10) for the rollers (7; 7') are fastened to the cross members (17; 17').

11. A shunt according to claim 1, characterized in that the rollers (7; 7') have a central peripheral groove (25) in which a driving belt (26) engages which is guided around a drive roller (24) mounted below the rollers (7; 7').

12. A shunt according to claim 11, characterized in that each drive roller (24) as well as carrying rollers (2a–2d; 2') optionally located in the section of the shunt (3) are driven by a common driving belt (27).

13. A shunt according to claim 1, characterized in that the rollers (7; 7') on both sides of the central peripheral groove (25) are provided with further peripheral grooves (41) to receive O-rings (42) of rubber.

14. A shunt according to claim 1, characterized in that the cover plate (34') extends over a section of a further removing conveyor track (5') extending in parallel to the conveyor (1), and that the rollers (7, 7') arranged, e.g., in pairs (4a–4d) are arranged offset in the direction of the removing conveyor track (5').

15. A shunt according to claim 14, characterized in that the forward rollers (7) are pivotable and the rearward rollers (7) are fixedly adjustable.

16. A shunt according to claim 14, characterized in that the cover plate (34') extends over a section of a further feeding conveyor (55) extending in parallel to the conveyor (1), which further conveyor track continues towards the removing conveyor track (5'), further rollers (7, 7') in offset arrangement being provided which are pivotable.

17. A shunt according to claim 16, characterized in that the last rollers extending in parallel (4g, 4'g) are fixedly adjustable.

* * * * *